(12) United States Patent
Tolbert

(10) Patent No.: US 8,789,870 B1
(45) Date of Patent: Jul. 29, 2014

(54) VEHICLE VISOR EXTENSION

(71) Applicant: Dorothy M. Tolbert, Prosperity, SC (US)

(72) Inventor: Dorothy M. Tolbert, Prosperity, SC (US)

(*) Notice: Subject to any disclaimer, the term of this patent is extended or adjusted under 35 U.S.C. 154(b) by 0 days.

(21) Appl. No.: 13/724,235

(22) Filed: Dec. 21, 2012

(51) Int. Cl.
*B60J 3/02* (2006.01)

(52) U.S. Cl.
CPC .................................. *B60J 3/0208* (2013.01)
USPC .......................................... 296/97.8; 296/97.9

(58) Field of Classification Search
USPC .......... 296/97.1, 97.4, 97.5, 97.8, 97.9, 97.12
See application file for complete search history.

(56) References Cited

U.S. PATENT DOCUMENTS

| | | | |
|---|---|---|---|
| 2,526,889 A * | 10/1950 | McComb ..................... 296/97.2 |
| 2,733,763 A * | 2/1956 | Nygaard ........................ 160/32 |
| 4,978,160 A * | 12/1990 | Welschoff .................... 296/97.8 |
| 5,466,029 A | 11/1995 | Zetterlund | |
| 5,513,892 A | 5/1996 | Thomas | |
| 5,749,618 A | 5/1998 | Jones | |
| 5,842,748 A * | 12/1998 | Cummins .................... 296/97.2 |
| 6,325,443 B1 | 12/2001 | Sanchez | |
| 6,565,140 B2 * | 5/2003 | Wells .......................... 296/97.2 |
| 8,215,696 B2 * | 7/2012 | Akiya ......................... 296/97.8 |
| 8,540,301 B2 * | 9/2013 | Watase ........................ 296/97.8 |
| 2010/0090494 A1 * | 4/2010 | Marcus et al. ............... 296/97.5 |

* cited by examiner

*Primary Examiner* — Glenn Dayoan
*Assistant Examiner* — Jason S Daniels
(74) *Attorney, Agent, or Firm* — Crossley Patent Law; Micah C. Gunn

(57) ABSTRACT

A vehicle visor extension that provides glare protection at sunset and sunrise by providing an auxiliary sun visor that has an upper portion which slidingly engages a cavity within an extant vehicle visor and that has a lower portion that selectively pivotally engages a bottom side of the upper portion, and that also is formed of glare reduction material.

1 Claim, 3 Drawing Sheets

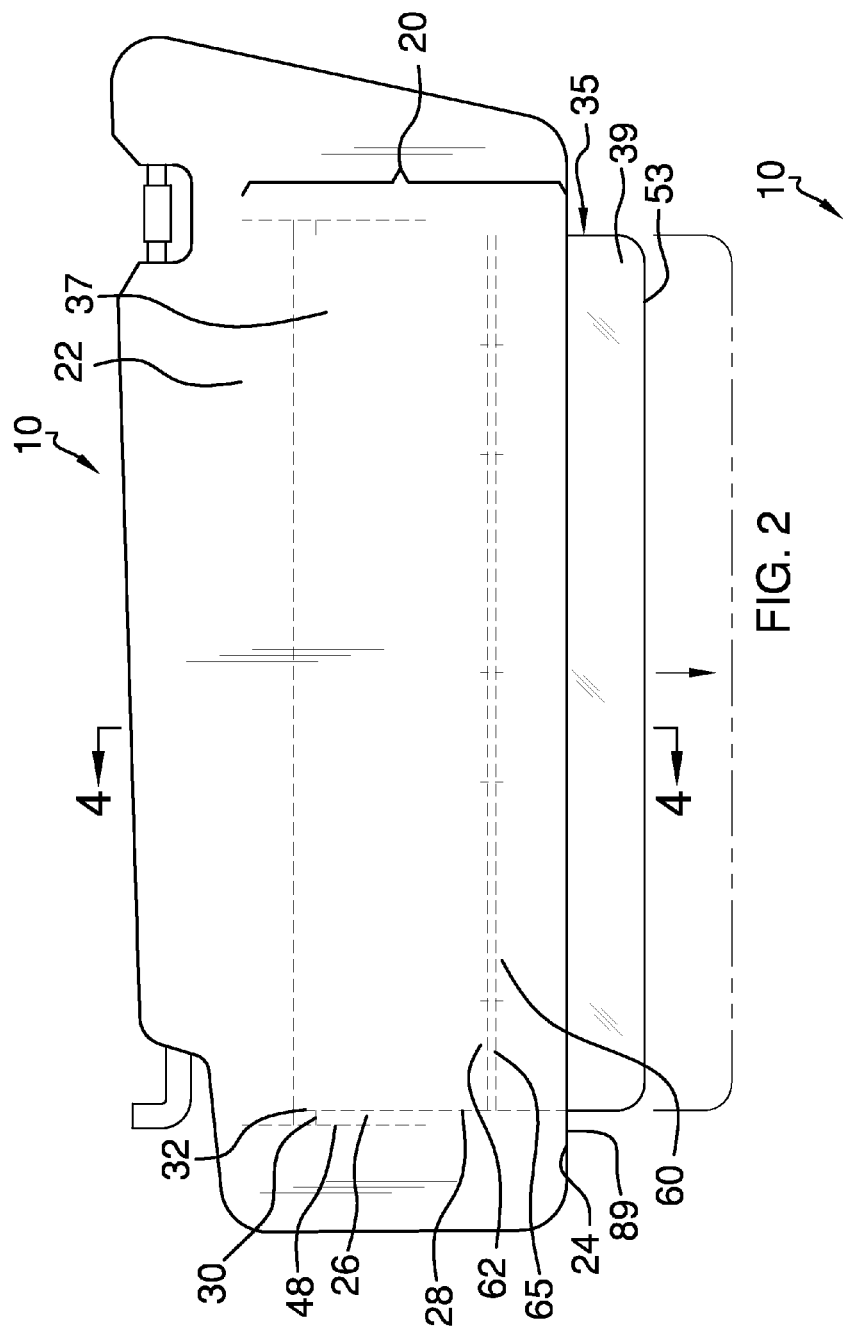
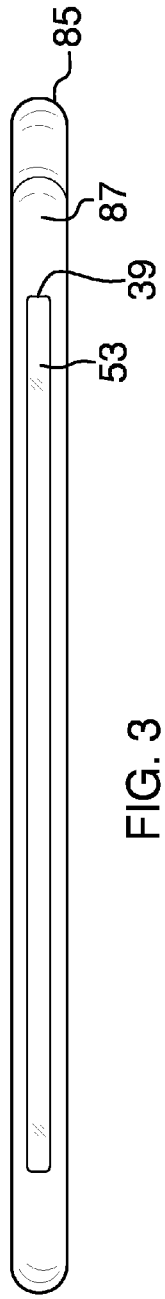
FIG. 2
FIG. 3

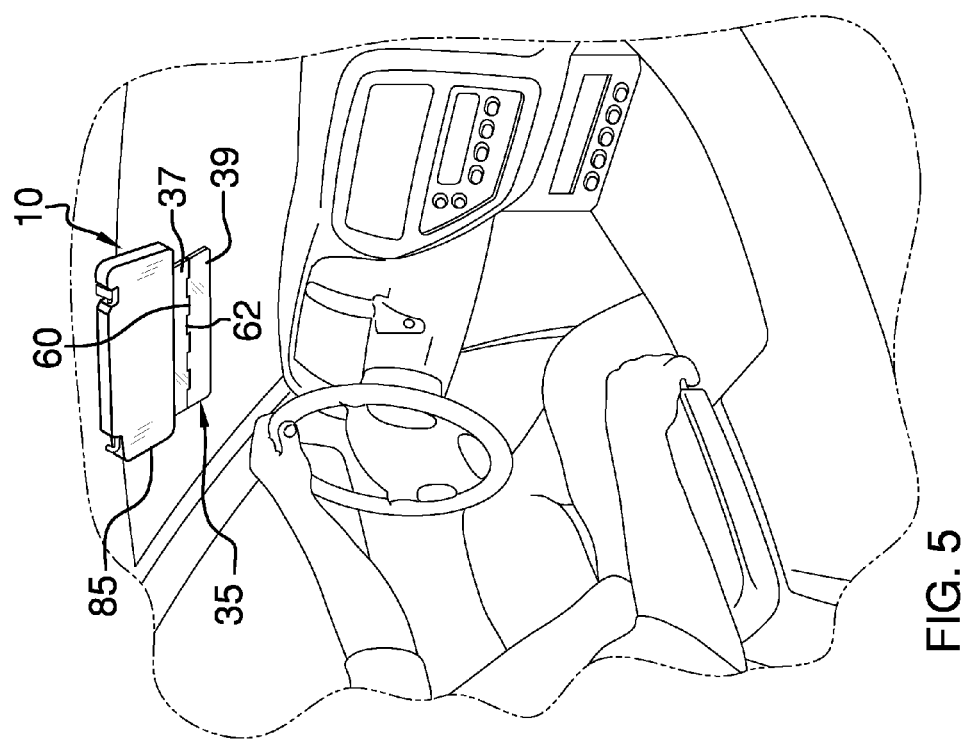
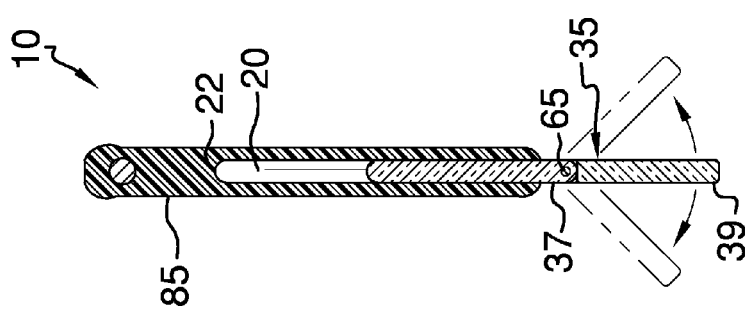
FIG. 5
FIG. 4

VEHICLE VISOR EXTENSION

BACKGROUND OF THE INVENTION

Various types of sun visor devices for automobiles are known in the prior art. Many of these sun visor devices are mounted on the surface of the vehicle headliner, lie against the headliner during disuse, and pivot downwardly to provide partial protection against glare as well as toward a vehicle side window during use. However, these sun visor devices do not protect against glare directed through the windshield when the sun is on the horizon either at sunrise or at sunset, thereby creating a hazardous driving condition. However, what is needed is a vehicle visor extension that provides glare protection at sunset and sunrise by providing an auxiliary sun visor that has an upper portion which slidingly engages a cavity within an extant vehicle visor and that has a lower portion that selectively pivotally engages a bottom side of the upper portion, and that also is formed of glare reduction material.

FIELD OF THE INVENTION

The present invention relates to vehicle sun visor devices, and more particularly, to a vehicle visor extension.

SUMMARY OF THE INVENTION

The general purpose of the present vehicle visor extension, described subsequently in greater detail, is to provide a vehicle visor extension which has many novel features that result in a vehicle visor extension which is not anticipated, rendered obvious, suggested, or even implied by prior art, either alone or in combination thereof.

To accomplish this, the present vehicle visor extension includes a cavity disposed within an extant vehicle visor. A channel, having a length approximately one-half the length of the cavity, is vertically disposed on each of a vertical side of the cavity and an upper side thereof. A stop is horizontally disposed proximal an upper end of each channel.

An auxiliary visor body, which slidingly engages the cavity, has an upper portion and a lower portion. A projection disposed on right and left sides of the upper portion proximal to a top side thereof slidingly engages the respective channel and frictionally engages an outer wall thereof. The upper portion slidingly engages the cavity from a retracted position completely inside the extant vehicle visor to a fully extended position. The lower portion pivotally selectively engages the upper portion from a forward position to a rearward position.

Alternating first protrusions and notches are fixedly disposed along the bottom side of the upper portion. Second protrusions, which pivotally engage the notches, are disposed along the top wall of the lower portion. A selectively adjustable hinge pin continuously engages each of a horizontal mid-line axis of the first and second protrusions and the notches. The hinge pin is configured to selectively pivot and releasably lock the lower portion into one of a selected forward and rearward position. The lower portion selectively, pivotally engages the upper portion from a forward position at a 225-degree angle to the upper portion to a rearward position at a 135-degree angle to the upper portion.

The auxiliary visor body is formed of a glare reduction material. The auxiliary body is configured to permit visual access through each of the front and rear sides of the upper portion and the front and rear walls of the lower portion. Thus has been broadly outlined the more important features of the present vehicle visor extension so that the detailed description thereof that follows may be better understood and in order that the present contribution to the art may be better appreciated.

BRIEF DESCRIPTION OF THE DRAWINGS

Figures

FIG. 2 is a front elevation view.
FIG. 3 is a bottom plan view.
FIG. 4 is a cross-sectional view taken along line 4-4 of FIG. 2.
FIG. 5 is an in-use view in an extended position.

DETAILED DESCRIPTION OF THE DRAWINGS

Figure 1:
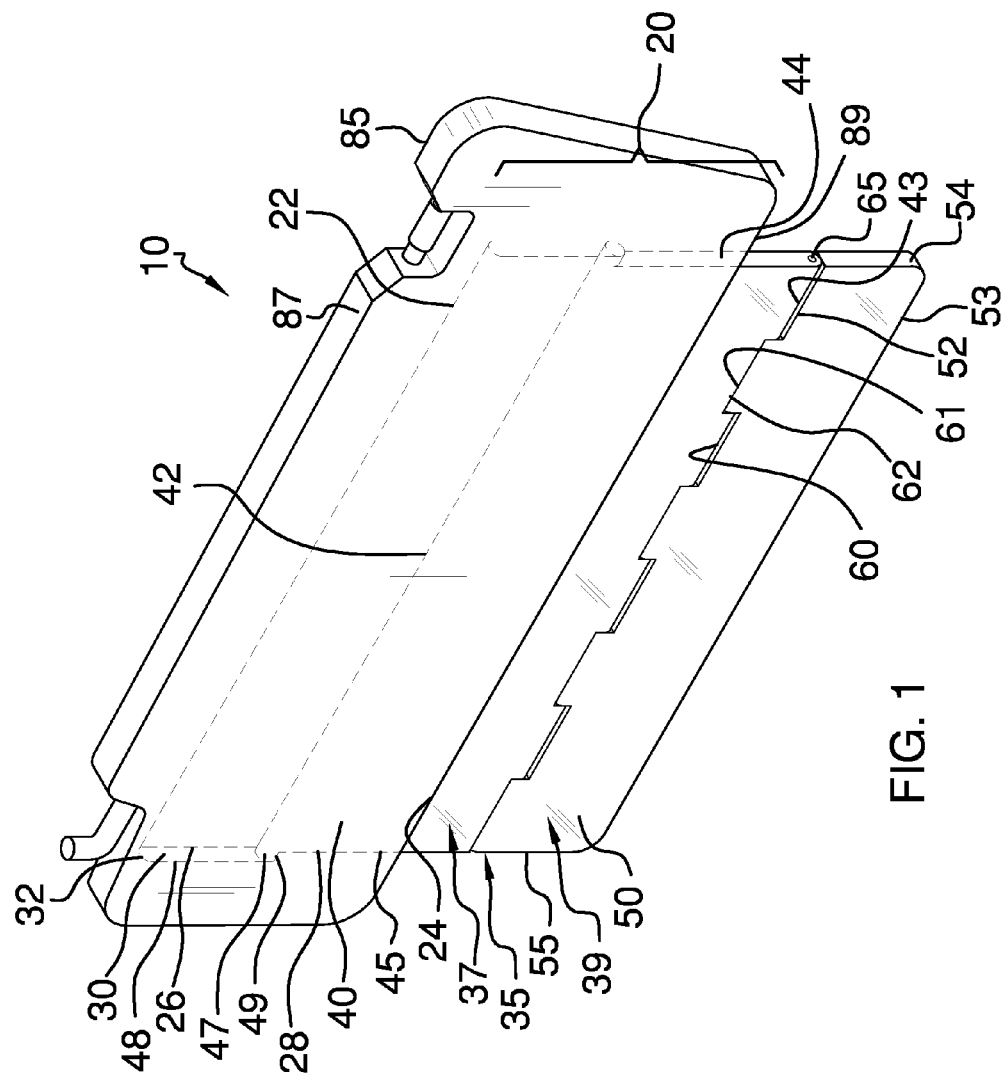
FIG. 1 is an isometric view.

With reference now to the drawings, and in particular FIGS. 1 through 5 thereof, an example of the instant vehicle visor extension employing the principles and concepts of the present vehicle visor extension and generally designated by the reference number 10 will be described.

Referring to FIGS. 1 through 5 a preferred embodiment of the present vehicle visor extension 10 is illustrated. The instant vehicle visor extension 10 includes a cavity 20 disposed within an extant vehicle visor 85. An upper side 22 of the cavity 20 is disposed proximal an upper wall 87 of the extant vehicle visor 85. A lower side 24 of the cavity 20 is disposed on a lower wall 89 of the extant vehicle visor 85 thereby forming an opening within the lower wall 89. A channel 26 is vertically disposed between each of a vertical side 28 of the cavity 20 and the upper side 22 of thereof. The channel 26 has a length approximately one-half the length of the cavity 20. A stop 30 is horizontally disposed proximal an upper end 32 of each channel 26.

An auxiliary visor body 35 is provided. The auxiliary visor body 35 has an upper portion 37 and a lower portion 39. The upper portion 37 has a front side 40, a rear side 41, a top side 42, a bottom side 43, a right side 44, and a left side 45. A projection 47 is disposed on each of the right side 44 and the left side 45 proximal the top side 42. Each projection 47 slidingly engages the respective channel 26 and frictionally engages an outer wall 48 thereof between a lower end 49 of the respective channel 26 and the stop 30 disposed within the respective channel 26. The frictional engagement of each projection 47 with the outer wall 48 of the respective channel 26 allows the selective vertical positioning of the projections 47 within the channels 26. The stop 30 in each channel 26 prevents the respective projection 47 from sliding out of the respective channel 26. The channel 26 permits the upper portion 37 of the auxiliary visor body 35 upper portion 37 to completely retract within the extant vehicle visor 85.

The lower portion 39 has a front wall 50, a rear wall 51, a top wall 52, a bottom wall 53, a right wall 54, and a left wall 55. The upper portion 37 slidingly engages the cavity 20 from a retracted position completely inside the extant vehicle visor 85 to a fully extended position with each of the projections 47 disposed on the lower end 49 of the respective channel 26 thereby permitting a user to adjust the upper portion as needed to reduce glare. The front side 40 of the upper portion 37 is directed toward a forward side 90 of the extant vehicle visor 85. The lower portion 39 top wall 52 is disposed parallel to and proximal the bottom side 43 of the upper portion 37 when the lower portion 39 is in a vertically aligned position at a 180-degree angle to the upper portion 37. The lower portion 37 pivotally selectively engages the upper portion 37 from a forward position to a rearward position.

A plurality of alternating first protrusions 60 and notches 61 is fixedly disposed along the bottom side 43 of the upper portion 35. A plurality of second protrusions 62, which pivotally engage the notches 61, is disposed along the top wall 52 of the lower portion 39. A selectively adjustable hinge pin 65 continuously engages each of a horizontal mid-line axis of the first and second protrusions 60, 62. The hinge pin 65 is configured to selectively pivot and releasably lock the lower portion 39 of the auxiliary visor body 35 into one of a selected forward and rearward position. The lower portion 39 selectively, pivotally engages the upper portion 37 from a forward position at a 225-degree angle to the upper portion 37 to a rearward position at a 135-degree angle to the upper portion 37 to permit the user to make additional adjustments to the auxiliary visor body lower portion to reduce glare shining in the user's eyes.

The auxiliary visor body 35 is formed of a glare reduction material. The auxiliary visor body 35 is configured to permit visual access through each of the front and rear sides 40, 41 of the upper portion 37 and the front and rear walls 50, 51 of the lower portion 39. The glare reduction material helps, in addition to the adjustable auxiliary visor body 35 upper and lower portions 60, 62, to reduce glare from shining in the user's eyes. The glare reduction material is the same as a glare reduction material that can be applied to the lenses of sunglasses for the reduction of glare.

What is claimed is:

1. A vehicle visor extension consisting of:
   a cavity disposed within an extant vehicle visor;
   an upper side of the cavity disposed proximal an upper wall of the extant vehicle visor;
   a lower side of the cavity disposed on a lower wall of the extant vehicle visor, wherein the lower side of the cavity forms an opening within the lower wall;
   a channel vertically disposed between each of a vertical side of the cavity and the upper side thereof, wherein the channel has a length approximately one-half the length of the cavity;
   a stop horizontally disposed proximal an upper end of each channel;
   an auxiliary visor body having an upper portion and a lower portion;
   wherein the upper portion has a front side, a rear side, a top side, a bottom side, a right side, and a left side;
   a single projection disposed on each of the right side and the left side proximal the top side;
   wherein each projection slidingly engages the respective channel and frictionally engages an outer wall thereof between a lower end of the respective channel and the stop disposed within the respective channel;
   wherein the lower portion has a front wall, a rear wall, a top wall, a bottom wall, a right wall, and a left wall;
   wherein the upper portion slidingly engages the cavity from a retracted position completely inside the extant vehicle visor to a fully extended position with each of the projections disposed on the lower end of the respective channel, wherein the front side of the upper portion is directed toward a forward side of the extant vehicle visor;
   wherein the lower portion top wall is disposed parallel to and proximal the bottom side of the upper portion when the lower portion is in a vertically aligned position at a 180-degree angle to the upper portion;
   wherein the lower portion pivotally selectively engages the upper portion from a forward position to a rearward position;
   a plurality of alternating first protrusions and notches disposed along the bottom side of the upper portion;
   a plurality of second protrusions disposed along the top wall of the lower portion, wherein the second protrusions pivotally engage the notches; and
   a selectively adjustable hinge pin continuously engaging each of a horizontal mid-line axis of the first and second protrusions;
   wherein the first and second protrusions pivotally engage each other;
   wherein the hinge pin is configured to selectively pivot and releasably lock the lower portion into one of a selected forward and rearward position;
   wherein the lower portion selectively, pivotally engages the upper portion from a forward position at a 225-degree angle to the upper portion to a rearward position at a 135-degree angle to the upper portion;
   wherein the auxiliary visor body is formed of a glare reduction material; and
   wherein the auxiliary body is configured to permit visual access through each of the front and rear sides of the upper portion and the front and rear walls of the lower portion.

* * * * *